United States Patent Office 3,595,903
Patented July 27, 1971

3,595,903
PROCESS FOR PREPARING ALIPHATIC
MONOMERCAPTANS
Carl C. Greco, Bronx, N.Y., assignor to Stauffer Chemical
Company, New York, N.Y.
No Drawing. Filed Sept. 20, 1967, Ser. No. 669,261
Int. Cl. C07c *149/06, 149/20*
U.S. Cl. 260—481     10 Claims

ABSTRACT OF THE DISCLOSURE

A process for preparing aliphatic monomercaptans which comprises, first neutralizing an organo sulfate of the formula:

$$\text{RO}-\overset{\overset{\displaystyle O}{\|}}{\underset{\underset{\displaystyle O}{\|}}{S}}-\text{OH}$$

wherein R is an aliphatic radical free of reactive substituents of from 1 to 18 carbon atoms, with a metal hydroxide. The resultant organo sulfate is then reacted with a metal trithiocarbonate and the resultant metal organic trithiocarbonate acidified with an aqueous acid to produce the desired aliphatic monomercaptan.

---

This invention relates to a process for preparing monomercaptans from organic sulfates. More particularly, this invention relates to a process for preparing monomercaptans by the successive steps of (1) neutralizing an organo sulfate with a metal hydroxide to form a metal organo sulfate, (2) reacting said metal organo sulfate with a metal trithiocarbonate, (3) acidifying the metal organic trithiocarbonate reaction product with an aqueous acid solution which provides a proton and an anion reactive with the aforesaid metal, and recovering the resultant aliphatic monomercaptan.

The classic and most economical process for the preparation of mono- and dimercaptans is the reaction of mono- and diolefins with hydrogen sulfide. Unfortunately, however, by this process considerable by-product dialkyl sulfide is formed. It is, accordingly, the primary object of this invention to provide a process for preparing organic mercaptans in good yield.

It has now been discovered that organic mercaptans can be prepared from organic sulfates having a hydroxyl substituent by the successive steps of neutralizing the organic sulfate, reacting the neutralization product with a metal trithiocarbonate and acidifying the resultant metal organic trithiocarbonate to produce the desired organic monomercaptan.

The process of the invention can be illustrated by the following reaction diagrams:

(1)     $\text{ROH} + \text{SO}_3 \longrightarrow \text{RO}\overset{\overset{\displaystyle O}{\|}}{\underset{\underset{\displaystyle O}{\|}}{S}}\text{OH}$ (2)     $\text{RO}\overset{\overset{\displaystyle O}{\|}}{\underset{\underset{\displaystyle O}{\|}}{S}}\text{OH} + \text{MOH} \longrightarrow \text{RO}\overset{\overset{\displaystyle O}{\|}}{\underset{\underset{\displaystyle O}{\|}}{S}}\text{OM} + \text{H}_2\text{O}$ (3)     $\text{RO}\overset{\overset{\displaystyle O}{\|}}{\underset{\underset{\displaystyle O}{\|}}{S}}\text{OM} + \text{M}_2\text{CS}_3 \longrightarrow \text{RS}\overset{\overset{\displaystyle S}{\|}}{\text{C}}\text{SM} + \text{M}_2\text{SO}_4$ (4)     $\text{RS}\overset{\overset{\displaystyle S}{\|}}{\text{C}}\text{SM} + \text{HX} \longrightarrow \text{RSH} + \text{CS}_2 + \text{MX}$ wherein R is an aliphatic radical, M is a metal ion, and X is an acid anion.

Hydroxy aliphatics which can be employed are the monohydroxy aliphatics of from 1 to 18 carbon atoms free of reactive substituents. Representative compounds are the primary and secondary alcohols and the hydroxy substituted carboxylic acids or their esters. Representative examples of suitable alcohols are methanol, ethanol, propanol, butanol, pentanol, hexanol, heptanol, octanol, nonanol, decanol, dodecanol, tetradecyl alcohol, and cetyl alcohol. Representative examples of suitable monohydroxy substituted carboxylic acid esters are ethyl hydroxy acetate, ethyl 1-hydroxy propionate, ethyl 2-hydroxy propionate, ethyl hydroxy butyrate, ethyl hydroxy heptanoate, ethyl hydroxy octanoate, ethyl hydroxy nonanoate, ethyl hydroxy dodecanoate, ethyl hydroxy hexadecanoate, and ethyl hydroxy octadecanoate. The ester moiety is removed in the acidification reaction depicted by reaction diagram (4), and accordingly the ethyl esters are illustrated for convenience only. The acid carboxyl group is not reactive however under the mild conditions of the reaction and if desired the hydroxy substituted acid can be employed as the hydroxy compound.

The reaction of diagram (1) is known and any sulfur trioxide complex can be used in place of sulfur trioxide. Examples of suitable sulfur trioxide complexes include: trialkylphosphate $\text{SO}_3$, and $\text{SO}_3$ in liquid $\text{SO}_2$. Chlorosulfonic acid can also be employed. Since the reaction is exothermic, it is preferred to conduct the reaction in the presence of an inert solvent such as the saturated hydrocarbons (cyclic or acyclic), chlorinated hydrocarbons, ethers and the like. Examples of solvents which can be employed include: heptane, isooctane, isodecane, pyridine, triethyl amine, carbon tetrachloride, chloroform, tetrahydrofuran, cyclohexane, dioxane and diethylene glycol dimethyl ether. Solvents which should be avoided are those having carbon-carbon double bonds, reactive alkylated aromatics such as xylene and compounds having hydroxyl groups or other reactive substituents. In order to operate most economically, it is preferred that the reactants be present in nearly stoichiometric proportions. A large excess of reactant can be employed, however, without ill effect. The organic mercaptan can be recovered by conventional means, such as by distillation, extraction, crystallization, and the like.

Metal hydroxides which can be employed in the neutralization reaction depicted above as diagram (2) are the metals of Group I and Group II of the Periodic Table. Examples of suitable materials are the hydroxides of potassium, sodium, barium, calcium and magnesium. Preferred, however, are the hydroxides of sodium and potassium by reason of their solubility. The metal trithiocarbonates are representative. Sodium trithiocarbonate is preferred by reason of its efficacy and economic availability.

Acids which can be used in the reaction depicted in reaction diagram (4) by HX are those whose aqueous solution provides protons and whose anion is reactive with the aforesaid metals. Representative are the common inorganic acids such as sulfuric, hydrochloric and nitric.

The process can be conveniently conducted at atmospheric pressure. The temperature of the reaction is not critical and can be between about 0° C. and about 100° C. It is preferred, however, that the reaction of reaction diagram (1) be maintained between about 0° C. and 40° C. for the reason that the reaction is exothermic. The reaction of diagram (3) is preferably conducted at a temperature between about 40° C. and 80° C. in order to obtain a moderate speed of reaction but the reactions of diagrams (2) and (4) are, of course, independent of temperature and can be conveniently conducted at room temperature.

While the invention is primarily concerned with the preparation of mercaptans from hydroxy compounds consisting essentially of carbon, hydrogen and oxygen atoms, the process is equally applicable to hydroxy substituted aliphatics having ether, thioether, and polysulfide groups dispersed between carbon atoms.

The following examples are illustrative of the invention process in its preferred embodiments.

EXAMPLE 1

To a 1 liter reaction flask fitted with a thermometer, stirrer and separatory funnel is added 200 cc. of dioxane containing 50 grams (0.314 mole) of a $SO_3$·pyridine complex. To this mixture is then added 33 grams (0.314 mole) of ethyl hydroxy acetate (ethyl glycolate), which addition is made at room temperature and requires 30 minutes for completion. The reaction mixture is then agitated at room temperature for 1 hour until the reaction mixture becomes clear. The mixture is then distilled on a flash evaporator to remove the dioxane solvent. The viscous oil which remains in the flask is identified as

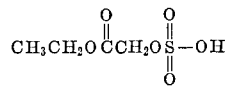

is dissolved in 100 cc. of water and this acid solution having a pH of 1.0 is neutralized to a pH of 7.0 by titration with a 25% aqueous solution of sodium hydroxide.

The reaction product which is identified as

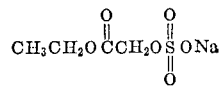

is reacted with 170 grams of 25.3% aqueous sodium trithiocarbonate at room temperature. After the addition is complete which requires 1 hour, the reaction mixture is heated to a temperature of 60° C. and maintained at that temperature for 2 hours. During this time, the trithiocarbonate half ester is hydrolized to the half sodium salt under the basic conditions of the reaction. The mixture is then cooled to 10° C., acidified with concentrated sulfuric acid, evaporated to dryness and the organic product extracted with ether. The ether is removed by distillation producing a yellow liquid identified as thioglycolic acid.

EXAMPLE 2

In accordance with the procedure of Example 1, 23.3 grams (0.314 mole) of N-butanol is added to a 1 liter reaction flask containing 50 grams (0.314 mole) of $SO_3$·pyridine complex and 200 cc. of dioxane. The resultant organo sulfate reaction product is then neutralized with a 25% aqueous solution of sodium hydroxide and the resultant metal organo sulfate reacted with 170 grams of 25.3% aqueous sodium trithiocarbonate. The mixture is then acidified with concentrated sulfuric acid. The organic product is extracted with ether, the ether removed by distillation and the resultant product identified as N-butyl mercaptan.

EXAMPLE 3

In accordance with the procedure of Example 1, 6-mercapto dodecane is prepared from 6-dodecanol (amyl hexyl carbinol).

EXAMPLE 4

In accordance with the procedure of Example 1, beta-mercapto ethyl heptanoic acid is prepared from beta-hydroxy ethyl heptanoate.

EXAMPLE 5

In accordance with the procedure of Example 1, beta-mercapto propionic acid is prepared from ethyl beta-hydroxy propionate.

What is claimed is:

1. A process for preparing alkyl and carboalkoxyalkyl monomercaptans which comprises:
   (a) neutralizing an organo sulfate of the formula:

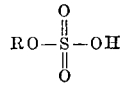

wherein R is selected from the group consisting of alkyl and carboalkoxyalkyl, with a metal hydroxide selected from the hydroxides of Groups I and II metals;
   (b) reacting the resultant organo sulfate with a metal trithiocarbonate selected from the trithiocarbonates of Groups I and II metals;
   (c) acidifying the resultant metal organic trithiocarbonate with an aqueous acid solution which provides a proton, and an anion reactive with the aforesaid metal; and
   (d) recovering the monomercaptan.

2. The process of claim 1 wherein the temperature of the reaction is maintained between about 0° C. and about 100° C.

3. The process of claim 1 wherein the metal hydroxide is selected from the hydroxides of sodium, potassium, calcium, and barium.

4. The process of claim 1 wherein the metal trithiocarbonate is sodium trithiocarbonate.

5. The process of claim 1 wherein the temperature of the reaction is maintained between about 40° C. and about 80° C.

6. The process of claim 1 wherein the organo sulfate is:

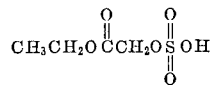

7. The process of claim 1 wherein the organo sulfate is:

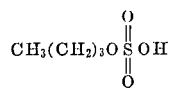

8. The process of claim 1 wherein the organo sulfate is:

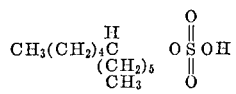

9. The process of claim 1 wherein the organo sulfate is:
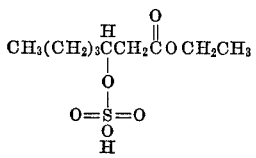
10. The process of claim 1 wherein the organo sulfate is:
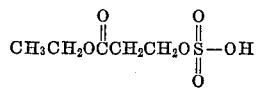
References Cited
UNITED STATES PATENTS
| | | | |
|---|---|---|---|
| 3,180,790 | 4/1965 | Goodhue | 167—22 |
| 2,152,461 | 3/1939 | Bishop | 260—455 |
| 1,771,550 | 7/1930 | Quigley | 260—459 |
OTHER REFERENCES
Reid: Org. Chem. of Bivalent Sulfur, vol. IV, pp. 177–8 (1962).
CHARLES B. PARKER, Primary Examiner
E. J. GLEIMAN, Assistant Examiner
U.S. Cl. X.R.
260—399, 455, 450, 526, 608, 609